(12) United States Patent  
Hasegawa

(10) Patent No.: US 7,116,942 B2  
(45) Date of Patent: Oct. 3, 2006

(54) RADIO COMMUNICATION APPARATUS AND METHOD OF CONTROLLING THE SAME

(75) Inventor: Jun Hasegawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 588 days.

(21) Appl. No.: 10/290,521

(22) Filed: Nov. 8, 2002

(65) Prior Publication Data

US 2004/0203460 A1 Oct. 14, 2004

(30) Foreign Application Priority Data

Sep. 10, 2002 (JP) ............................ 2002-264214

(51) Int. Cl.
*H04B 7/00* (2006.01)
*H04B 17/02* (2006.01)
*H04Q 7/20* (2006.01)

(52) U.S. Cl. ................... 455/67.11; 455/66.1; 455/88; 455/134; 455/135; 455/138; 455/234.12; 455/423; 455/240.1

(58) Field of Classification Search ........... 455/66.1, 455/67.11, 88, 134, 135, 138, 234.12, 423, 455/240.1

See application file for complete search history.

(56) References Cited

U.S. PATENT DOCUMENTS 5,953,649 A * 9/1999 Junell ................... 455/67.11

6,363,127 B1 3/2002 Heinonen et al.
6,529,708 B1 * 3/2003 Larsson et al. .......... 455/67.16

FOREIGN PATENT DOCUMENTS

JP 11-252061 9/1999
JP 2001-189692 7/2001

* cited by examiner

*Primary Examiner*—Matthew Anderson
*Assistant Examiner*—Yuwen Pan
(74) *Attorney, Agent, or Firm*—Oblon, Spivak, McClelland, Maier & Neustadt, P.C.

(57) ABSTRACT

A radio communication apparatus includes a radio signal processing section which produces a first signal. A power calculation section produces a power value signal of the first signal. A correlation detection section produces correlative value signals corresponding to a correlation between the first signal and a known signal. A first and a second detection section detect a beginning of the reception signal, using the power value signal and the correlative value signal respectively. The first and the second detection section respectively produce a first detection and a second detection signal, each of which include information of a beginning timing of the reception signal. A select control section is supplied with the first and the second detection signals and selectively outputs one of them. A demodulation section demodulates a data signal from the first signal using an output signal from the select control section.

26 Claims, 8 Drawing Sheets

RADIO COMMUNICATION APPARATUS AND METHOD OF CONTROLLING THE SAME

CROSS-REFERENCE TO RELATED APPLICATIONS

This application is based upon and claims the benefit of priority from the prior Japanese Patent Application No. 2002-264214, filed Sep. 10, 2002, the entire contents of which are incorporated herein by reference.

BACKGROUND OF THE INVENTION

1. Field of the Invention

The present invention relates to, for example, radio communication. In particular, this invention relates to detection of a beginning timing of a received signal in a receiving section of a radio communication apparatus.

2. Description of the Related Art

In the field of radio communications, there is known IEEE802.11 standards defined by the Institute of Electrical and Electronics Engineers (IEEE). A receiving section of a system based on the standards will now be described in brief.

FIG. 9 is a functional block diagram schematically showing a general structure of a receiving section of a radio communication apparatus based on IEEE802.11 standards. Signals received by antennas 102a or 102b are frequency-converted and amplified by a radio section 103. An output signal from the radio section 103 is amplified with a pre-determined gain by an automatic gain control (AGC) section 105. An output signal from the AGC section 105 is converted to a digital signal by an analog-to-digital (A/D) converter section 106. An output signal from the A/D converter section 106 passes through a band filter section 107 and an automatic frequency control section 108 and is then demodulated into a data bit string by a demodulation process section 109.

A signal head detection section 110 detects a beginning timing of the received signal. A control section 112 controls antenna diversity in the radio section 103. The control section 112 also adjusts the gain in the AGC section 105 so that the amplitude of the input signal to the A/D converter section 106 may fall within a suitable conversion range of the A/D converter section 106.

In radio communications based on IEEE802.11 standards, etc., a preamble, which precedes a data signal, is added to the head of a radio signal. The preamble has a form in which a predetermined number of known patterns, each having a certain cycle, are combined. The preamble is used for signal head detection, automatic gain control, antenna diversity control, timing synchronization, automatic frequency control, etc.

In order to effect antenna diversity, the control section 112 finds mean power values of preambles of reception signals received by the antennas 102a and 102b. In consideration of characteristics of the preambles, a certain time period is needed to find the mean values of the received power.

In addition, timing synchronization and automatic frequency control are performed using preambles, it is necessary that the antenna diversity control be finished prior to these operations. In short, the antenna diversity control has to be completed at early stages of preambles.

Since there are many processes associated with preambles, it is necessary to detect as early as possible the beginning timing of preamble signals, i.e. the heads of the received signals.

In a conventional signal head detection method, for example, power mean values of signals are obtained for two different periods and the beginnings of the signals are detected using a difference between the mean values as well as a reference value. In addition, it is generally known that noise other than desired signal(s) mixed in received signals. In order to eliminate the effect of noise, an average time for finding power mean values is increased. In particular, when a signal-to-noise ratio (SNR) is low, it is necessary to obtain average values over a long time. Hence, it is difficult to detect heads of received signals at an early stage.

Furthermore, a certain time period is needed until the gain control of the AGC section 105 is stabilized after the control section 112 delivered a control signal to the AGC section 105. Consequently, the heads of received signals cannot be detected until this control is completed.

The gain of the AGC section 105 is fixed while reception signals are being awaited, that is, until the heads of received signals are detected. Besides, the conversion range of the A/D converter section 106 is limited. Because of these factors, signals out of the conversion range may be supplied to the A/D converter section 106, depending on the levels of received signals. As a result, an output signal of the A/D converter 106 may be saturated. In particular, when the noise levels of the received signals are high and the noise level of the output signal of the A/D converter section 106 is nearly saturated, power mean values of desired signal(s) would hit the ceiling. Then, the difference between power mean values decreases below the reference value and the heads of the received signals cannot be detected.

BRIEF SUMMARY OF THE INVENTION

According to a first aspect of the invention, there is provided a radio communication apparatus comprising: an antenna which receives a radio signal and outputs the same as a reception signal; a radio signal processing section which frequency-converts and amplifies the reception signal and produces a first signal; a power calculation section which calculates a power value of the first signal and produces a power value signal; a first detection section which detects a beginning timing of the reception signal using the power value signal, and produces a first detection signal including information of the beginning timing of the reception signal in accordance with a detection result; a correlation detection section which produces a correlative value signal in accordance with correlation between the first signal and a known signal; a second detection section which detects the beginning timing of the reception signal using the correlative value signal, and produces a second detection signal including information of the beginning timing of the reception signal in accordance with a detection result; a select control section which is supplied with the first detection signal and the second detection signal and selectively outputs one of the first detection signal and the second detection signal; and a demodulation section which demodulates a data signal from the first signal using an output signal from the select control section.

According to a second aspect of the invention, there is provided a control method for a radio communication apparatus, comprising: frequency-converting and amplifying a reception signal received by an antenna and producing a first signal; calculating a power value of the first signal and producing a power value signal; detecting a beginning timing of the reception signal using the power value signal, and producing a first detection signal including information of the beginning timing of the reception signal in accordance with a detection result; producing a correlative value signal in accordance with correlation between the first signal and a known signal; detecting the beginning timing of the reception signal using the correlative value signal, and producing a second detection signal including information of the beginning timing of the reception signal in accordance with a detection result; selectively outputting one of the first detection signal and the second detection signal; and restoring a data signal from the first signal using one of the first detection signal and the second detection signal.

Figure 1:
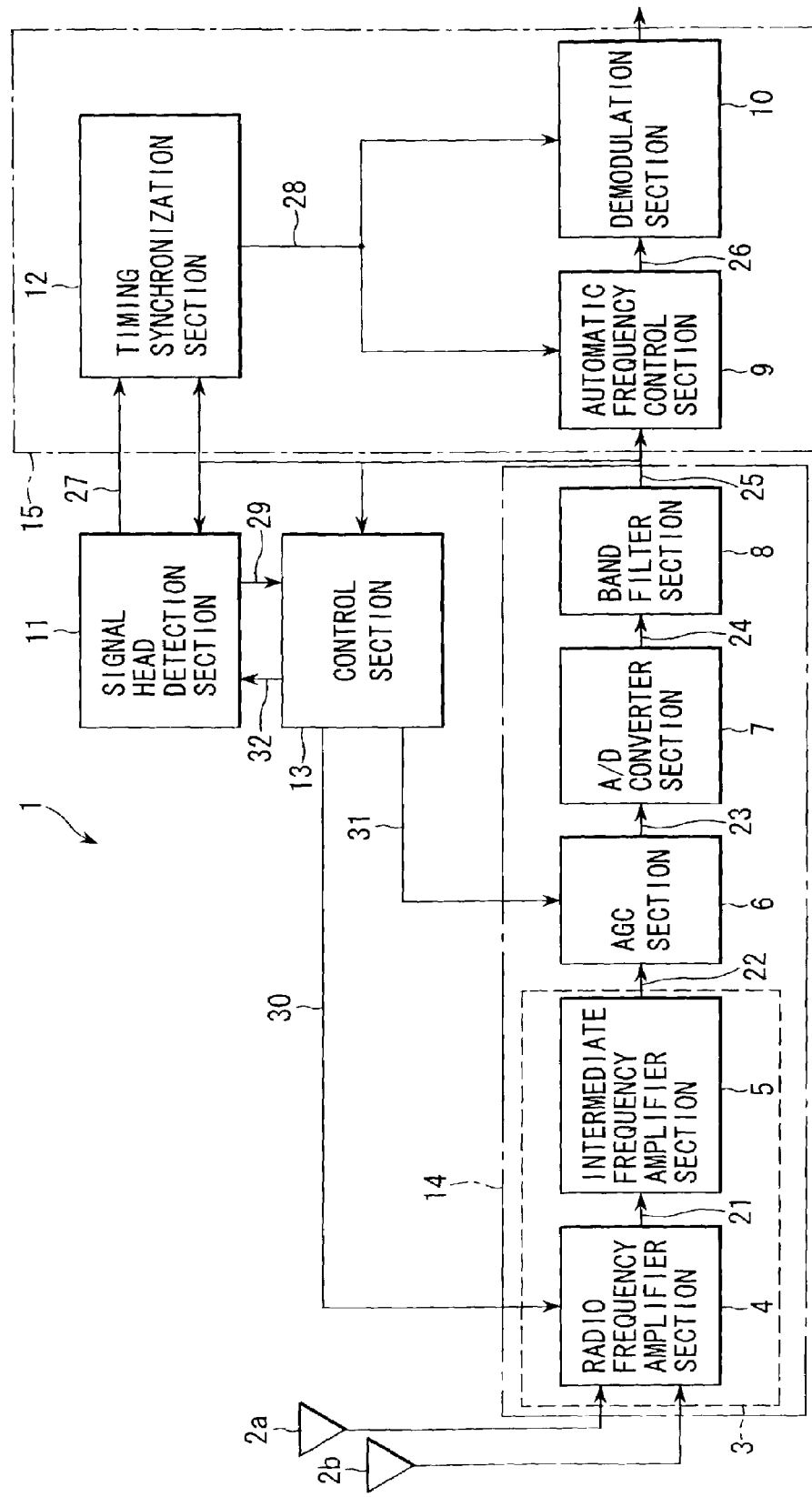
FIG. 1 is a functional block diagram schematically showing a receiving section of a radio communication apparatus according to a first embodiment of the present invention.

DETAILED DESCRIPTION OF THE INVENTION (First Embodiment)

Embodiments of the present invention will now be described with reference to the accompanying drawings. In descriptions below, structural parts having substantially the same functions and structures are denoted by like reference numerals, and a description of common parts is repeated only where necessary.

FIG. 1 is a functional block diagram schematically showing a receiving section 1 of a radio communication apparatus according to a first embodiment of the present invention. The receiving section 1 has, for example, two antennas 2a and 2b for the purpose of effecting antenna diversity. In the antenna diversity operation, either antenna 1a or antenna 1b, which is in a better reception condition, is selected. Thereby, a better reception environment is obtained, compared to the case of using a single antenna.

The antennas 2a and 2b receive analog radio signals. The antennas 2a and 2b feed output signals (received signals) to a radio signal processing section 14. The radio signal processing section 14 performs frequency conversion, amplification, etc. for the received signal, and produces a first signal 25. As is shown in FIG. 1, for example, the radio signal processing section 14 comprises a radio circuit section (radio circuit) 3, an automatic gain control (AGC) section (gain control circuit) 6, an analog-to-digital (A/D) converter section (analog-to-digital converter circuit) 7, and a band filter section 8. The radio circuit section 3 includes, for example, a radio frequency amplifier section 4 and an intermediate frequency amplifier section 5.

In the radio signal processing section 14, the received signals are fed to the radio frequency amplifier section 4. The radio frequency amplifier section 4 converts transmission signal(s) with a frequency suitable for a transmission to an intermediate-frequency signal. In addition, the radio frequency amplifier section 4 is controlled by a control signal 30 from a control section (control circuit) 13 (to be described later) so as to effect switching between the signal from the antenna 2a and the signal from the antenna 2b and to output the selected signal. The radio frequency amplifier section 4 outputs the received signal, which has been converted to the intermediate frequency signal, as an output signal 21.

The output signal 21 from the radio frequency amplifier section 4 is supplied to the intermediate frequency amplifier section 5. The intermediate frequency amplifier section 5 converts the signal 21 to a baseband signal and outputs the converted signal as an output signal 22.

The output signal 22 from the intermediate frequency amplifier section 5 is delivered to the AGC section 6. The AGC section 6 adjusts the gain of the signal 22 so that the signal 22 may properly be converted to a digital signal in the A/D converter section 7 (to be described later). Specifically, the AGC section 6 adjusts the gain of the signal 22 so that the digital signal, to which the output signal of the AGC section 6 has been converted by the A/D converter section 7, may not be saturated. The adjustment of gain is controlled by a signal 31 from the control section 13 (to be described later). The AGC section 6 outputs a signal 23 amplified with a proper gain.

The output signal 23 from AGC section 6 is delivered to the A/D converter section 7. The A/D converter section 7 converts the signal 23 to a digital signal. The A/D converter section 7 outputs the converted digital signal as an output signal 24.

The output signal 24 from A/D converter section 7 is supplied to the band filter section 8. The band filter section 8 filters the supplied signal 24 to eliminate components other than a component of a predetermined frequency band. This aims at eliminating frequency components of other channels adjacent to a desired channel. Typically, the band filter section 8 comprises a finite impulse response filter. The band filter section 8 outputs a filtered signal (first signal) 25.

The output signal 25 from the band filter section 8 is delivered to a demodulation section 15. The demodulation section 15 demodulates the signal 25 to a data signal, using, e.g. a signal from a signal head detection section 11 (to be described later). The demodulation section 15 comprises, for example, an automatic frequency control section 9, a demodulation processing section 10 and a timing synchronization section 12.

In the demodulation section 15, the signal 25 is supplied to the automatic frequency control section 9. The automatic frequency control section 9 corrects a phase rotation per unit time of the signal received by the antenna 2a, 2b. At first, using the output signal 28 of the timing synchronization section 12 (to be described later), the automatic frequency control section 9 estimates a phase rotation amount (frequency offset) per unit time over the transmission path. Then, the phase of the signal 25 is properly rotated based on the estimated result. Thus, the phase rotation per unit time of the received signal is corrected. The automatic frequency control section 9 outputs a phase-controlled signal 26.

The output signal 26 of the automatic frequency control section 9 is supplied to the demodulation processing section 10. The demodulation processing section 10 generates a data bit string from the signal 26, using the output signal 28 from the timing synchronization section 12. Thereby, demodulated reception data is extracted.

The output signal 25 of band filter section 8 is also supplied to the signal head detection section 11. The signal head detection section 11 detects a head timing of the received signal by a method to be described below. Then, the signal head detection section 11 produces an output signal 27 including head timing information of the received signal. If the detection of the head timing is completed, the signal head detection section 11 delivers a signal 29 indicative of the completion to the control section 13.

The output signal 27 of signal head detection section 11 is delivered to the timing synchronization section 12. The output signal 25 of the band filter section 8 is also delivered to the timing synchronization section 12. The timing synchronization section 12 performs timing synchronization for the signal 25, on the basis of the head timing information of the received signal that is included in the output signal 27. In short, the timing synchronization section 12 detects the beginning of the data timing of the received signal. The timing synchronization section 12 outputs the signal 28 including the resultant timing information. The output signal 28 is supplied to the automatic frequency control section 9 and demodulation processing section 10.

The output signal 25 of band filter section 8 is also delivered to the control section 13. The control section 13 controls the antenna switching in the radio frequency amplifier section 4. Specifically, the control section 13 calculates mean power values of the respective antennas 2a and 2b and evaluates them. Thus, the control section 13 selects one of the antennas 2a and 2b, which is in a better reception condition, and supplies a corresponding control signal 30 to the radio frequency amplifier section 4.

The control section 13 also controls the gain adjustment of the AGC section 6, as mentioned above, by delivering the control signal 31 to the AGC section 6.

Figure 2:
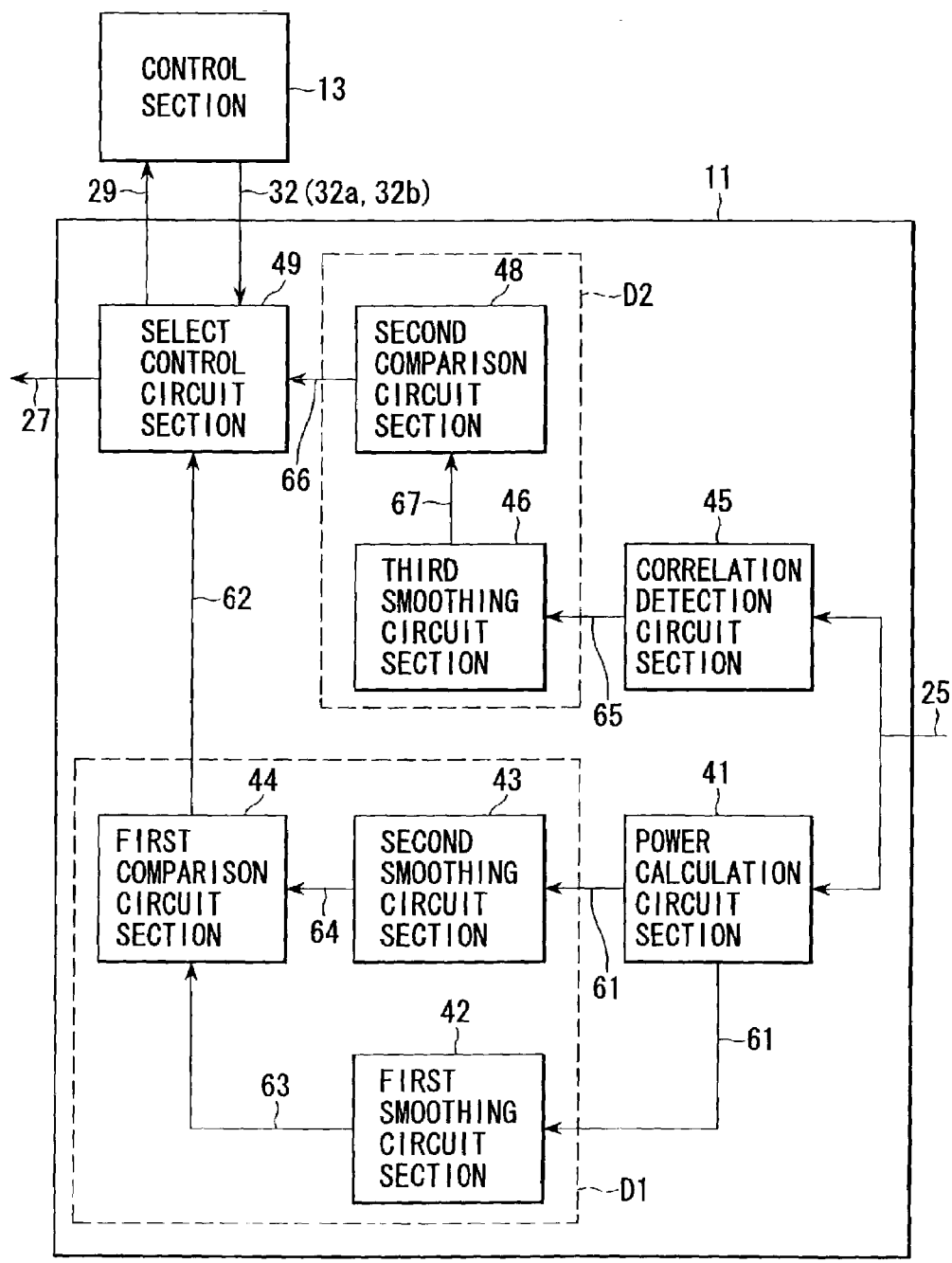
FIG. 2 is a functional block diagram schematically showing a signal head detection section 11 shown in FIG. 1.

The signal head detection section 11 will now be described. FIG. 2 is a functional block diagram schematically showing the signal head detection section 11. The output signal 25 of band filter section 8 is supplied to a power calculation circuit section (power calculation section) 41 and a correlation detection circuit section (correlation detection section) 45.

The power calculation circuit section 41 calculates a power value per sample. The power calculation circuit section 41 successively produces signals 61 including power value information of each sample.

It is known that the incoming of desired signal(s) can be estimated using a power mean value of a signal in a certain time period and a power mean value of a signal in a different time period. Using this technique, the head of the reception signal can be detected. Specifically, the signal 61 is delivered to a first detection section D1, and the first detection section D1 detects the head of the received signal using the signal 61. Then, the first detection section D1 produces a detection signal 62 including head timing information of the received signal.

A concrete method of signal head detection in the first detection section D1 will now be described. The first detection section D1 comprises, for example, a first smoothing circuit section (first smoothing circuit) 42, a second smoothing circuit section (second smoothing circuit) 43, and a first comparison circuit section 44. In the first detection section D1, the signal 61 is supplied to the first and second smoothing circuit sections 42 and 43.

The first smoothing circuit section 42 smoothes power values of the received signal over a period (first period) corresponding to a predetermined number of preceding samples from the present time point. The first smoothing circuit section 42 produces a signal 63 as a smoothed result (power mean value PS). For the smoothing method, a statistical process may be adopted. For instance, smoothing can be performed by geometrical averaging. The number of samples to be smoothed may be set, for instance, at eight preceding samples from the present time point. Thereby, a power mean value of the received signal in a short time period immediately before the present time point can be obtained.

The second smoothing circuit section 43 smoothes samples at timing and in a time period different from those for the first smoothing circuit section 42. The time period (second time period) for smoothing is set to be longer than that of the first smoothing circuit section 42. The second smoothing circuit section 43 produces a signal 64 as a smoothed result (power mean value PL). The smoothing method may be the same as in the first smoothing circuit section 42. The second smoothing circuit section 43 may find a geometric mean of, e.g. 32 samples, that is, samples from the preceding 32nd sample to the preceding 64th sample from the present time point. Thereby, a long-term trend of the power mean value of the received signal can be found.

The signals 63 and 64 are supplied to the first comparison circuit section 44. The first comparison circuit section 44 calculates a ratio of the power mean value PS and PL (PS/PL) and determines whether the resultant ratio is greater than a preset reference value (first reference value). In this case, a difference value obtained by subtracting a logarithm value of the power mean value PL from that of PS may be used instead of the ratio. Further, a difference obtained by subtracting the power mean value PL from that of PS may also be used. If it is determined that the resultant ratio or the difference exceeds the first reference value, the first comparison circuit section 44 produces a signal (first detection signal) 62 including information indicative of signal head detection.

On the other hand, the correlation detection circuit section 45 outputs a signal corresponding to the correlation between the received signal and a preamble pattern. A preamble pattern (known signal) is input in the correlation detection circuit section 45 in advance. The correlation detection circuit section 45 finds the correlation between the known preamble pattern and the received signal, and produces a signal 65 including the found result. The information on the correlation is successively found for each sample, and successively output. The correlation detection circuit section 45 may comprise, e.g. a matched filter circuit.

It is known that a correlation between a known signal pattern and a reception signal including the known signal pattern is found and a beginning timing (head timing) of the reception signal can be detected by evaluating the correlation. Specifically, in the second detection section D2, a correlative value between the signal 65 and a known pattern, for instance, is statistically processed (i.e. subjected to an averaging process) and timing with a salient correlative value is detected as the head of the received signal. Then, the second detection section D2 outputs a signal 66 including the head timing information of the received signal.

A concrete method of signal head detection in the second detection section D2 will now be described. The second detection section D2 comprises, for example, a third smoothing circuit section (third smoothing circuit) 46 and a second comparison circuit section 48. In the second detection section D2, the signal 65 is supplied to the third smoothing circuit section 46. The third smoothing circuit section 46 performs a statistical process for a time period (third time period) of a plurality of samples, thus effecting a smoothing process. The third smoothing circuit section 46 produces a signal 67 as a smoothed result (correlative mean value CS). For the smoothing process, arithmetic averaging, for instance, may be adopted. The time period for the statistical process may be a period corresponding to, e.g. two or three samples.

The reason why the statistical process is performed by the third smoothing circuit will now be explained. When clock synchronism is established between a transmitter and a receiver, one peak occurs at a high-correlation point if the output of the correlation detection circuit section 45 is observed along the time axis. On the other hand, if there is a clock error between the transmitter and receiver, two or more peaks, which are lower than in normal cases, may occur. Thus, by finding a short-term mean value in the third smoothing circuit section 46, the head of the received signal can be detected using the correlation value even if the clock error has occurred.

For the same reason, the effect of delay due to multipath can be avoided. If the effect of multipath is considered, for example, the average time in the third smoothing circuit section 46 may be set substantially equal to a delay time due to multipath.

The signal 67 is supplied to the second comparison circuit section 48. The second comparison circuit section 48 calculates a ratio of the correlative mean value CS and a preset value (CS/preset value) and determines whether the resultant ratio is greater than a preset reference value (second reference value). In this case, a difference value obtained by subtracting a logarithm value of the preset value from that of the correlative mean value CS may be used instead of the ratio. Further, a difference obtained by subtracting the preset value from the correlative mean value CS may also be used. It is determined that the resultant ratio or the difference exceeds the second reference value, the second comparison circuit section 48 outputs a signal (second detection signal) 66 indicative of the signal head detection.

The signals 62 and 66 are supplied to a select control circuit section (select section) 49. Output signals 32a and 32b of the control section 13 are also supplied to the select control circuit section 49. The select control circuit section 49 outputs one of the signals 62 and 66 in accordance with the following conditions.

The select control circuit section 49 outputs neither the first detection signal 62 nor the second detection signal 66 during a time period in which gain adjustment affects the result of signal head detection using power values and correlative values. This time period can be determined by activating a timer (not shown), etc. in response to the start of gain adjustment in the AGC section 6. It is known that the time period (first awaiting time period) in which the gain adjustment affects the result of the signal head detection using correlative values is generally shorter than a time period (second awaiting time period) in which the gain adjustment affects the result of the signal head detection using power values.

For example, in the control section 13, the timer measures the first awaiting time period and second awaiting time period upon starting of the gain adjustment in the AGC section 6. During a time period (first available time period) from the end of the first awaiting time period to the re-start of the time period in which the gain adjustment affects the signal head detection using power values, the control section 13 supplies a first notice signal 32a indicating this state to the select control circuit section 49. Similarly, during a time period (second available time period) from the end of the second awaiting time period to the re-start of the time period in which the gain adjustment affects the signal head detection using correlative values, the control section 13 supplies a second notice signal 32b indicating this state to the select control circuit section 49.

The select control circuit section 49 produces as the output signal 27 either the first detection signal 62 or the second detection signal 66, corresponding to which one of the following conditions is satisfied first: the first detection signal 62 is supplied while the first notice signal 32a is being supplied (first condition), or the second detection signal 66 is supplied while the second notice signal 32b is being supplied (second condition). In other words, if the first condition is first satisfied, the first detection signal 62 is output as the signal 27. If the second condition is first satisfied, the second detection signal 66 is output as the signal 27. Thereby, the signal awaiting state is terminated. The select control circuit section 49 supplies the control section 13 with a third notice signal 29 indicative of the termination of the signal awaiting state.

Following the termination of the signal awaiting state in the signal head detection section 11, a higher layer of a communication network protocol, for example, detects completion of reception of a signal frame. A signal indicating this is delivered to the select control circuit section 49. As a result, the signal head detection section 11 is restored to the signal awaiting state. Alternatively, completion of reception of a signal frame can be determined by detecting a fall of a power mean value of the received signal.

Figure 3:
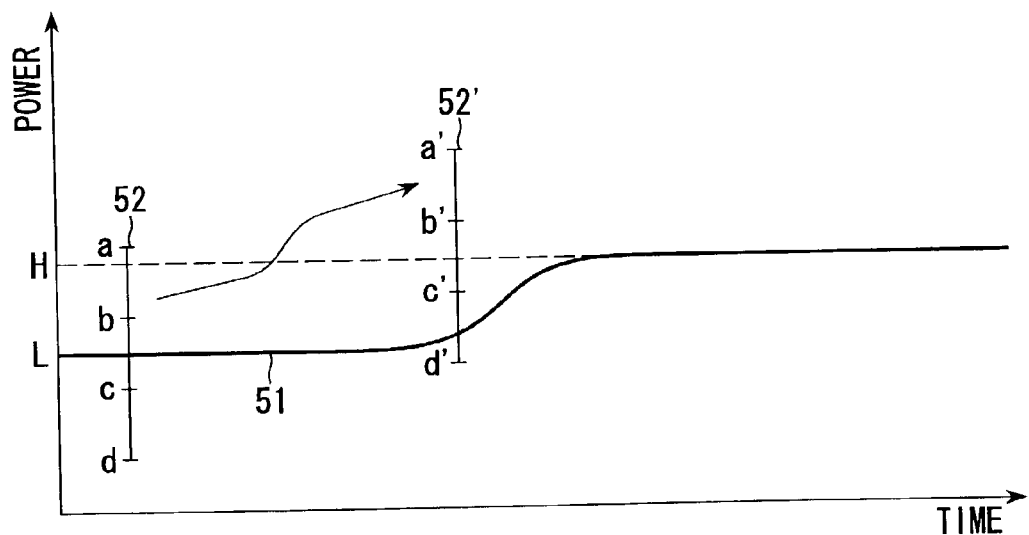
FIG. 3 is a graph illustrating an automatic gain control method in a reception signal awaiting state.

FIG. 3 is a graph illustrating an automatic gain control method in a reception signal awaiting state. In FIG. 3, a solid line 51 indicates the state of the reception signal which has been passed through the A/D converter section 7 and band filter 8 and averaged by a smoothing circuit section (not shown) in the control section 13. In this case, the smoothing circuit section in the signal head detection section 11 may be shared by the control section 13.

A gain control is effected by using the signal indicated by the solid line 51. In FIG. 3, reference numeral 52 indicates a conversion range of the A/D converter section 7. In other words, the A/D converter section 7 can convert the input analog signal to a digital signal in a conversion range between a power value d and a power value a. Power values b and c in the conversion range 52 are reference values for automatic gain control.

As described above, the signal 25, which has been subjected to gain conversion in the AGC section 6, A/D conversion in the A/D converter section 7 and filtering in the band filter section 8, is supplied to the control section 13. In the control section 13, the signal 25 is averaged. When the averaged signal 51 is between power values b and c of the conversion range 52 (corresponding to value L in FIG. 3), the control section 13 maintains the gain in the AGC section 6.

On the other hand, assume that the value of the received signal has varied and the signal 51 has taken a value H. The control section 13 detects that the value of signal 51 has exceeded the power value b. Then, the control section 13 outputs the control signal 31 to properly control the gain in the AGC control section 6. As a result, the value of signal 51 varies and the relationship between the signal 51 and conversion range 52 varies (to a conversion range 52'). Then, the control section 13 adjusts the gain in the AGC section 6 such that the signal 51 may be set between power values b' and c' of the conversion range 52'.

Figure 4:
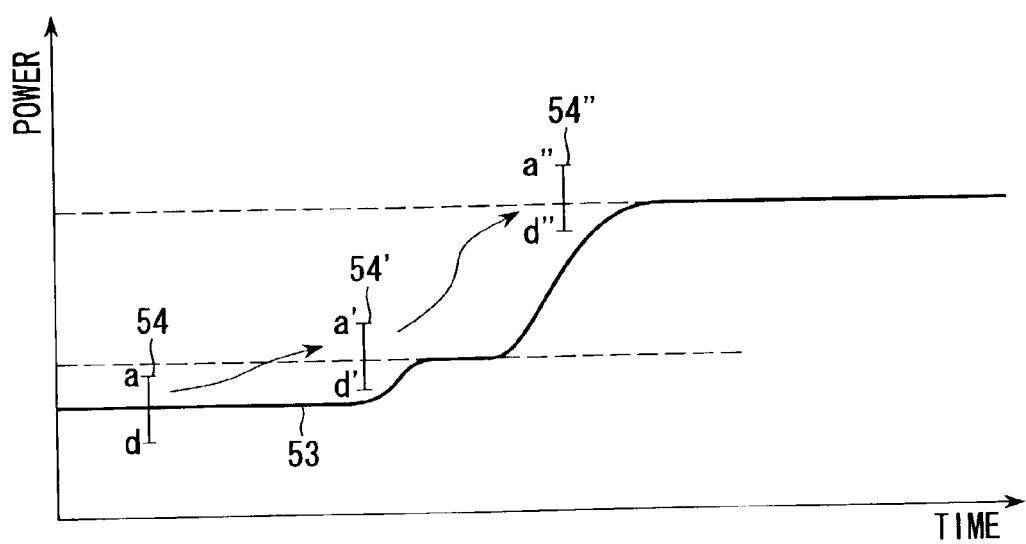
FIG. 4 is a graph illustrating an automatic gain control method in a reception signal awaiting state.

FIG. 4 is a graph illustrating the concept of the automatic gain control method in the reception signal awaiting state. In FIG. 4, a solid line 53 indicates an actual mean power of a desired signal(s) over the transmission path. As shown in FIG. 4, in the concept of the automatic gain control, the gain is successively controlled such that the mean power of desired signal(s) over the transmission power may fall within matching ranges 54, 54' and 54" of A/D converter section 7.

Figure 5:
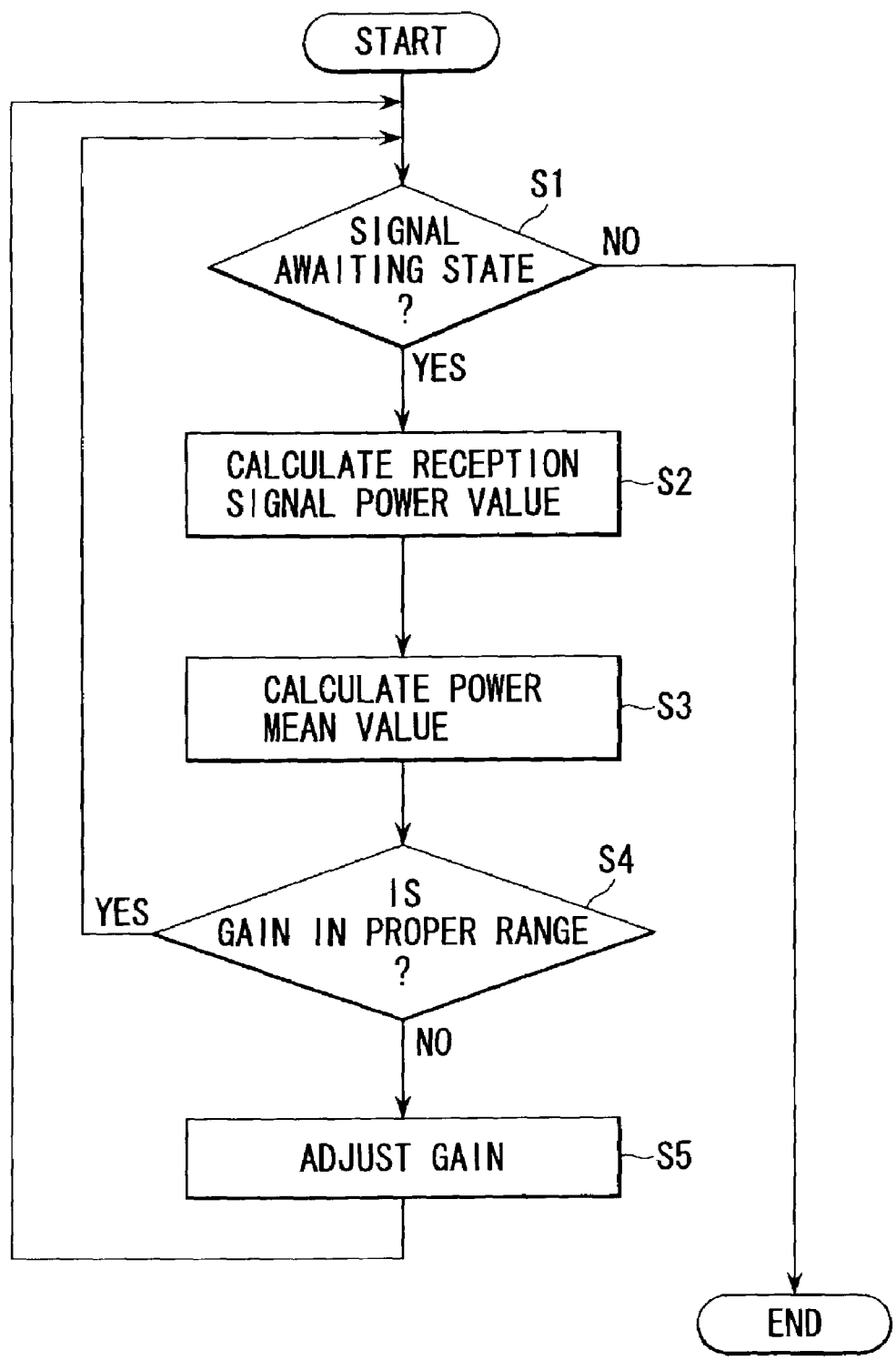
FIG. 5 is a flow chart illustrating a gain control process of the radio communication apparatus according to the first embodiment of the invention.

FIG. 5 is a flow chart illustrating the gain control process of the radio communication apparatus according to the first embodiment of the invention. As is shown in FIG. 5, in step S1, it is determined whether the present state is the signal awaiting state. If it is not the signal awaiting state, the process ends. If it is the signal awaiting state, the received signal is amplified with a certain gain, and the power value of the amplified reception signal is calculated in step S2. In step S3, a mean power value is calculated. In step S4, it is determined whether the gain in step S2 is proper or not. If the gain is proper, the process advances to step S1. On the other hand, if the gain is not proper, the gain is adjusted in step S5.

Figure 6:
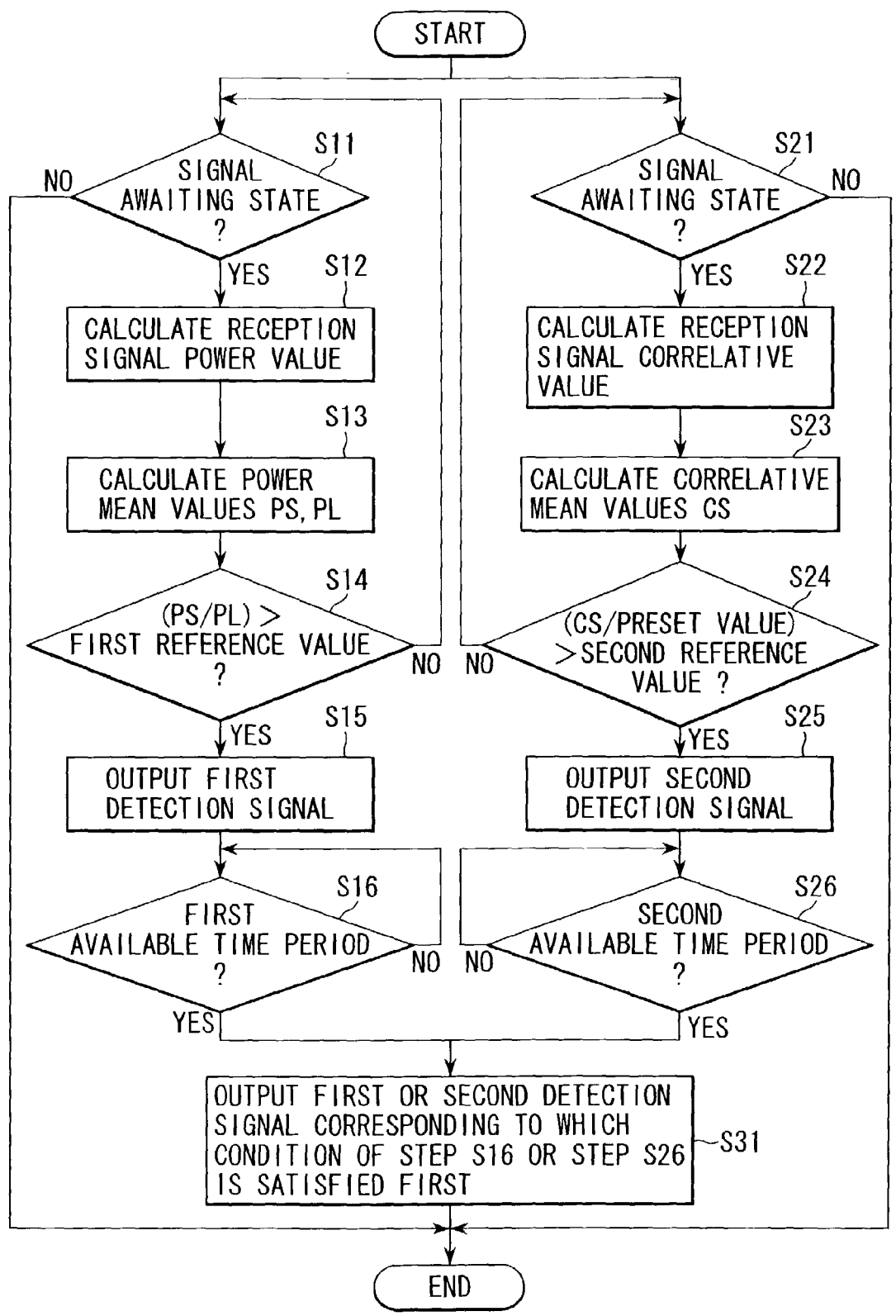
FIG. 6 is a flow chart illustrating a signal head detection process of the radio communication apparatus according to the first embodiment of the invention.

FIG. 6 is a flow chart illustrating a signal head detection process of the radio communication apparatus according to the first embodiment of the invention. As is shown in FIG. 6, in step S11, it is determined whether the present state is the signal awaiting state. If it is not the signal awaiting state, the process ends. If it is the signal awaiting state, the power value of the received signal is calculated in step S12. In step S13, power mean values PS and PL in the above-mentioned first and second time periods are calculated. Then, in step S14, if the ratio of the power mean value PS and PL is equal to the first reference value or less, the process returns to step S11. On the other hand, if the ratio is greater than the first reference value, the first detection signal 62 is output (step S15). In step S16, it is determined whether the present time is in the first available time period. If it is not in the first available time period, step S16 is repeated. If it is in the first available time period, the process goes to step S31.

Similarly, in step S21, it is determined whether the present state is the signal awaiting state. If it is not the signal awaiting state, the process ends. If it is the signal awaiting state, the correlative value of the received signal is calculated in step S22. In step S23, the correlative mean value CS in the above-mentioned third time period is calculated. Then, in step S24, if the ratio of the correlative mean value CS and the preset value is equal to the second reference value or less, the process returns to step S21. On the other hand, if the ratio is greater than the second reference value, the second detection signal 62 is output (step S25). In step S26, it is determined whether the present time is in the second available time period. If it is not in the second available time period, step S26 is repeated. If it is in the second available time period, the process goes to step S31.

In step S31, on of the detection signal is output according to which condition of step S16 or the step S26 is satisfied first.

The blocks and combinations of the blocks in the flow charts of FIGS. 5 and 6 may be executed by instructions of computer programs. These computer programs are read by a computer or a programmable device and constitute a system for realizing the operations of the present embodiment. In other words, the instructions by computer programs are executed by a computer or a programmable device and constitute means for carrying out the functions specified by the blocks in the flow charts. The computer programs are stored in memory media such as magnetic disks (a floppy disk, a hard disk, etc.), optical disks (CD-ROM, DVD, etc.) and semiconductor memories. Alternatively, the computer programs may be transmitted over communication media.

According to the first embodiment of the invention, when the head of the received signal is detected, two methods are adopted. One method is associated with a variation in power value of the received signal, and the other method is associated with a variation in correlative value of the received signal. The head of the received signal can be detected at an early stage by selecting the head-detected signal whose signal head has first been detected after the end of the time period during which the gain adjustment affects the result of signal head detection.

The method using the correlative values is less affected by the increase/decrease of the signal-to-noise ratio of the received signal than the method using power mean values. It is thus thinkable to adopt a method of detecting the head of the received signal, which uses only the correlative values. To achieve this, an analog-to-digital converter having an infinite conversion range is required. However, the conversion range of the A/D converter is limited, and an output signal of the A/D converter may be saturated in the vicinity of an upper limit or a lower limit of the conversion range. Then, when a correlative value is to be found, it would decrease, and the signal head could not be detected by using the correlative value. Accordingly, high-precision detection can be performed by detecting the signal head of the reception signal by using both the power value and correlative value, as in the present embodiment.

Besides, according to the first embodiment of the invention, while the reception signal is being awaited, the AGC section 6 successively performs gain control following the variation in the reception signal. Thus, if the input signal to the A/D converter section 7 includes such a stationary varying noise that a signal head cannot be detected by a power mean value, it is possible to prevent the input signal from falling out of the digital conversion range of the A/D converter section 7. Accordingly, even if the noise level in the reception signal is high, the output from the A/D converter section 7 is prevented from being saturated. Therefore, even when the noise level in the reception signal is high, the head of the reception signal can be detected by using the power value of the reception signal.

(Second Embodiment)

Figure 7:
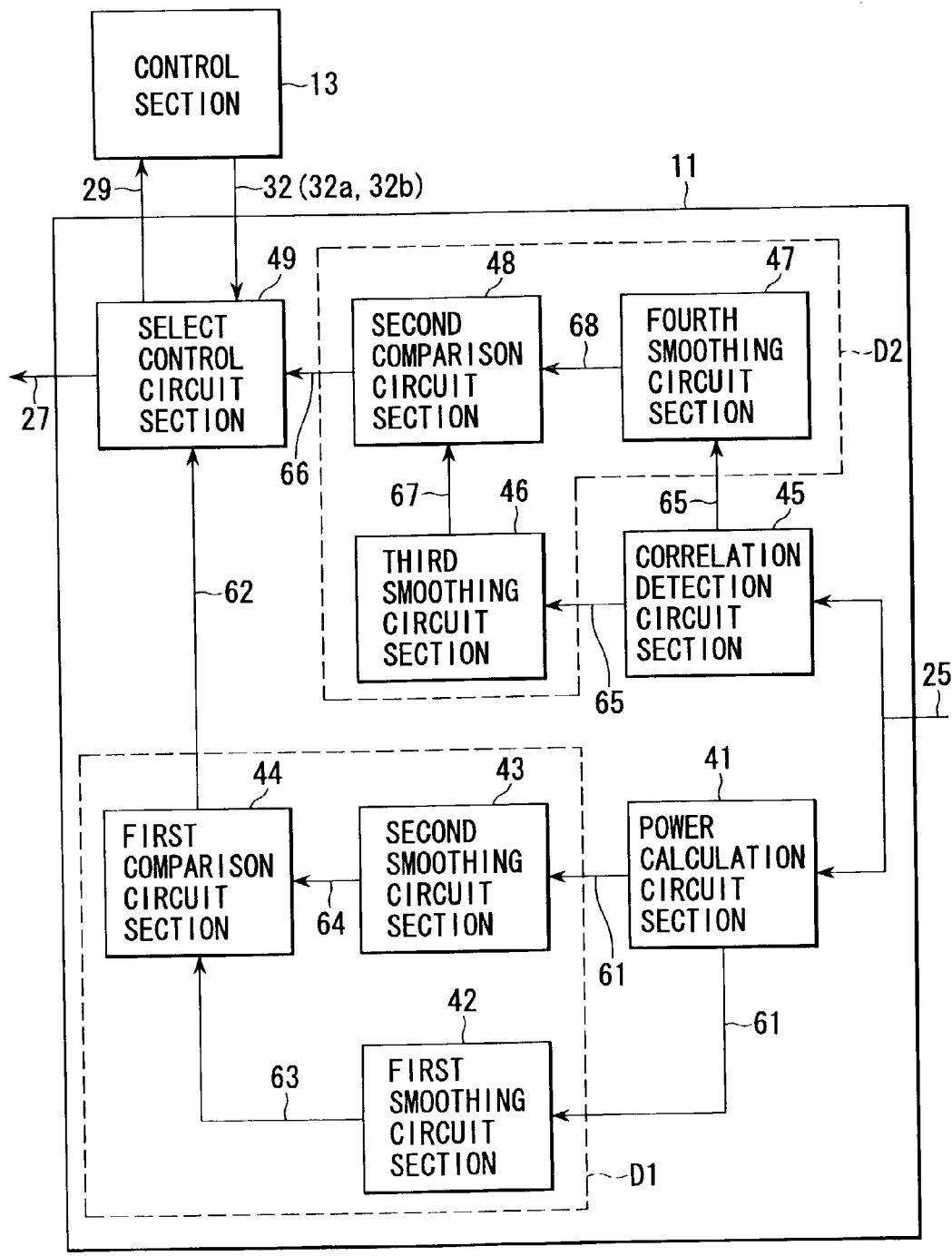
FIG. 7 is a functional block diagram schematically showing a signal head detection section 11 according to a second embodiment of the invention.

FIG. 7 is a functional block diagram schematically showing a signal head detection section 11 of a radio communication apparatus according to a second embodiment of the invention. In the second embodiment, two correlative mean values are used when the head of the reception signal is detected using the correlative value. Other parts are as same as the first embodiment.

As is shown in FIG. 7, the second detection section D2 comprises a fourth smoothing circuit section (fourth smoothing circuit) 47 in addition to the third smoothing circuit section 46 and second comparison circuit section 48. The output signal 65 of the correlation detection circuit section 45 is supplied to the third smoothing circuit section 46 and fourth smoothing circuit section 47. The fourth smoothing circuit section 47 performs smoothing by finding, e.g. an arithmetic average over a time period (fourth time period) longer than that of third smoothing circuit section 46. The time period for smoothing may be set at, e.g. 16 samples period as counted from the present time point. The fourth smoothing circuit section 47 outputs a signal 68 as a smoothed result (correlative mean value CL).

The signals 67 and 68 are supplied to the second comparison circuit section 48. The second comparison circuit section 48 performs an operation which is equal to the one of first embodiment except that the preset value is replaced with the correlative mean value CL. The second comparison circuit section 48 outputs a signal 66 indicative of the detection of the signal head if the resultant ratio or the difference obtained by aforementioned method is greater than the second reference value.

Since the fourth smoothing circuit 47 is provided, the head of the reception signal can be detected using the correlative values, even where the adjustment precision of the AGC section 6 is low. Specifically, when the correlative mean value CS and the preset value are compared, the peak of the correlative value takes a low value if the gain is relatively low. As a result, the correlative value cannot exceed the preset value, and the head of the reception signal may fail to be detected. On the other hand, if the gain is relatively large, the correlative value increases even at a point that is not the peak, and noise may erroneously be detected as the head of the reception signal. Thus, the correlative mean value CL is obtained by the fourth smoothing circuit 47, and the second comparison circuit section 48 performs relative comparison. Accordingly, even if the precision of the AGC section 6 in the reception signal awaiting state is low, the head of the reception signal can be detected.

Figure 8:
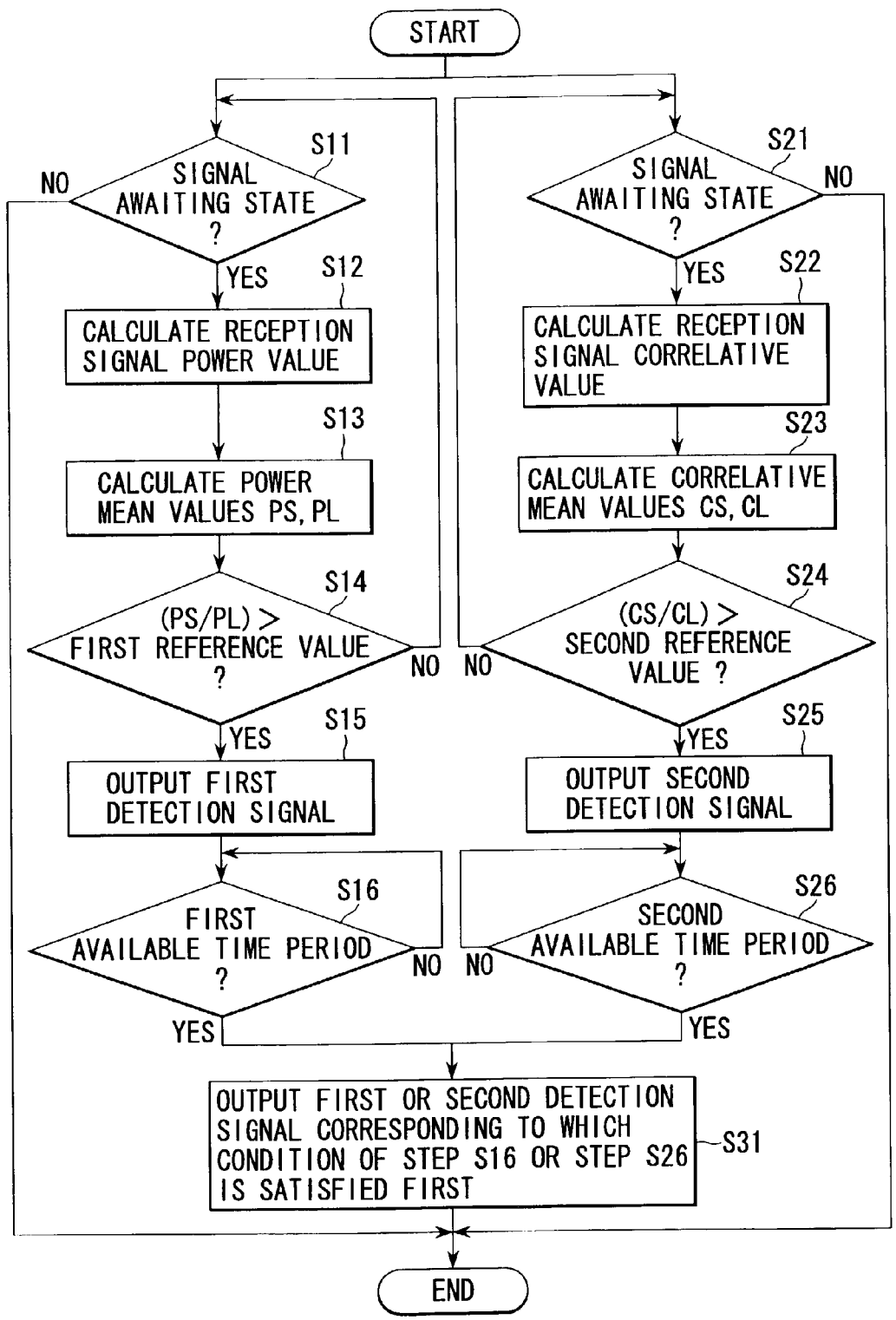
FIG. 8 is a flow chart illustrating a signal head detection process of the radio communication apparatus according to the second embodiment of the invention.
Figure 9:
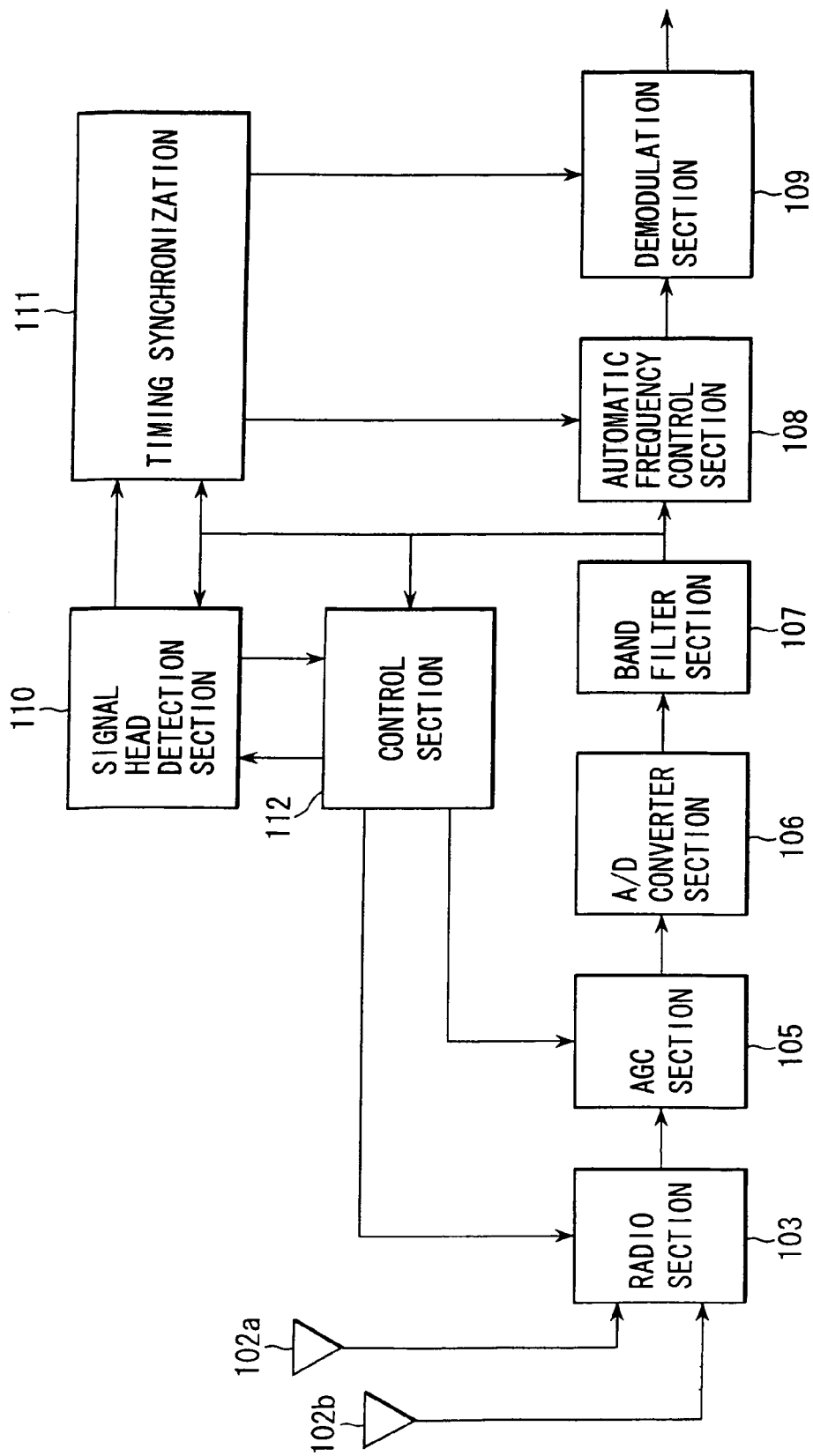
FIG. 9 is a functional block diagram schematically showing a general structure of a receiving section of a radio communication apparatus.

FIG. 8 is a flow chart illustrating a signal head detection process of the radio communication apparatus according to the second embodiment of the invention. The flow chat is equal to the one of FIG. 6 except that correlative mean value CS and CL are obtained in step S23 and whether the ratio of the correlative mean value CS and CL is determined to be greater than the second reference value in step S24.

According to the second embodiment, the same advantages as with the first embodiment can be obtained. Moreover, in the second embodiment, when the reception signal head is detected using the correlative values, two correlative mean values are used. It is thus possible to prevent plural peaks from incidentally occurring at a point with high correlation. Therefore, the reception signal head can be detected using the correlation, even when a clock error or a multipath propagation has occurred.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus comprising:
    an antenna which receives a radio signal and outputs the same as a reception signal;
    a radio signal processing section which frequency-converts and amplifies the reception signal and produces a first signal;
    a power calculation section which calculates a power value of the first signal and produces a power value signal;
    a first detection section which detects a beginning timing of the reception signal using the power value signal, and produces a first detection signal including information of the beginning timing of the reception signal in accordance with the detection result;
    a correlation detection section which produces a correlative value signal in accordance with correlation between the first signal and a known signal;
    a second detection section which detects a beginning timing of the reception signal using the correlative value signal, and produces a second detection signal including information of the beginning timing of the reception signal in accordance with a detection result;
    a select control section which is supplied with the first detection signal and the second detection signal and selectively outputs one of the first detection signal and the second detection signal; and
    a demodulation section which demodulates a data signal from the first signal using an output signal from the select control section.

2. The radio communication apparatus according to claim 1, wherein the radio signal processing section comprises:
    a radio circuit which converts the reception signal that is an analog signal to a baseband signal;
    a gain control circuit which amplifies an output signal of the radio circuit with a predetermined gain;
    an analog-to-digital converter circuit which converts an output signal of the gain control circuit to a digital signal and produces the first signal; and
    a control circuit which evaluates the first signal and controls the gain of the gain control circuit such that an amplitude of the output signal of the gain control circuit may not fall out of a conversion range within which the analog-to-digital converter circuit is able to effect digital conversion.

3. The radio communication apparatus according to claim 2, wherein the control circuit has a function of supplying a first notice signal to the select control section over a first effect time period, and supplying a second notice signal to the select control section over a second effect time period, and
    the select control section has a function of outputting the first detection signal in a case where the select control section has been supplied with the first detection signal while the select control section is being supplied with the first notice signal, and outputting the second detection signal in a case where the select control section has been supplied with the second detection signal while the select control section is being supplied with the second notice signal.

4. The radio communication apparatus according to claim 3, wherein the first available time period is a time period in which the control of the gain does not affect the detection of the beginning timing of the reception signal by use of the power value signal, and
    the second available time period is a time period in which the control of the gain does not affect the detection of the beginning timing of the reception signal by use of the correlative value signal.

5. The radio communication apparatus according to claim 2, wherein the select control section supplies the control circuit with a third notice signal indicative of completion of an awaiting state for the reception signal, when the select control section outputs one of the first detection signal and the second detection signal.

6. The radio communication apparatus according to claim 1, wherein the first detection section comprises:
a first smoothing circuit which smoothes the power value signal over a first time period;
a second smoothing circuit which smoothes the power value signal over a second time period that is longer than the first time period; and
a first comparison circuit which outputs the first detection signal when a result obtained by subtracting an output signal of the second smoothing circuit from an output signal of the first smoothing circuit is greater than a first reference value.

7. The radio communication apparatus according to claim 1, wherein the first detection section comprises:
a first smoothing circuit which smoothes the power value signal over a first time period;
a second smoothing circuit which smoothes the power value signal over a second time period that is longer than the first time period; and
a first comparison circuit which outputs the first detection signal when a ratio of an output signal of the first smoothing circuit and an output signal of the second smoothing circuit is greater than a first reference value.

8. The radio communication apparatus according to claim 1, wherein the second detection section comprises:
a third smoothing circuit which smoothes the correlative value signal over a third time period; and
a second comparison circuit which outputs the second detection signal when a result obtained by subtracting a preset value from an output signal of the third smoothing circuit is greater than a second reference value.

9. The radio communication apparatus according to claim 1, wherein the second detection section comprises:
a third smoothing circuit which smoothes the correlative value signal over a third time period; and
a second comparison circuit which outputs the second detection signal when a ratio of an output signal of the third smoothing circuit and a preset value is greater than a second reference value.

10. The radio communication apparatus according to claim 9, wherein the control circuit successively controls the gain in accordance with a variation in the reception signal during the awaiting state.

11. The radio communication apparatus according to claim 1, wherein the second detection section comprises:
a third smoothing circuit which smoothes the correlative value signal over a third time period;
a fourth smoothing circuit which smoothes the correlative value signal over a fourth time period that is longer than the third time period; and
a second comparison circuit which outputs the second detection signal when a result obtained by subtracting an output signal of the fourth smoothing circuit from an output signal of the third smoothing circuit is greater than a second reference value.

12. The radio communication apparatus according to claim 1, wherein the second detection section comprises:
a third smoothing circuit which smoothes the correlative value signal over a third time period;
a fourth smoothing circuit which smoothes the correlative value signal over a fourth time period that is longer than the third time period; and
a second comparison circuit which outputs the second detection signal when a ratio of an output signal of the third smoothing circuit and an output signal of the fourth smoothing circuit is greater than a second reference value.

13. The radio communication apparatus according to claim 1, wherein the correlation detection section is a matching filter.

14. The radio communication apparatus according to claim 1, wherein the radio communication apparatus is based on IEEE802.11 standards.

15. A control method for a radio communication apparatus, comprising:
frequency-converting and amplifying a reception signal received by an antenna and producing a first signal;
calculating a power value of the first signal and producing a power value signal;
detecting a beginning timing of the reception signal using the power value signal, and producing a first detection signal including information of the beginning timing of the reception signal in accordance with the detection result;
producing a correlative value signal in accordance with correlation between the first signal and a known signal;
detecting a beginning timing of the reception signal using the correlative value signal, and producing a second detection signal including information of the beginning timing of the reception signal in accordance with a detection result;
selectively outputting one of the first detection signal and the second detection signal; and
demodulating a data signal from the first signal using one of the first detection signal and the second detection signal.

16. The method according to claim 15, wherein the producing of the first signal comprises:
converting the reception signal that is an analog signal to a baseband signal;
amplifying the converted baseband signal with a predetermined gain;
converting the amplified signal to a digital signal and producing the first signal; and
evaluating the first signal and controlling the gain such that an amplitude of the output signal of the gain control circuit may not fall out of a conversion range within which the analog-to-digital conversion can be performed.

17. The method according to claim 16, wherein the control method for the radio communication apparatus further comprises:
outputting a first notice signal to the select control section over a first effect time period; and
outputting a second notice signal to the select control section over a second effect time period, and
said selective outputting of one of the first detection signal and the second detection signal comprises:
outputting the first detection signal in a case where the first detection signal has been output while the first notice signal is being output; and
outputting the second detection signal in a case where the second detection signal has been output while the second notice signal is being output.

18. The method according to claim 17, wherein the first available time period is a time period in which the control of the gain does not affect the detection of the beginning timing of the reception signal by use of the power value signal, and the second available time period is a time period in which the control of the gain does not affect the detection of the beginning timing of the reception signal by use of the correlative value signal.

19. The method according to claim 16, further comprising:
finishing the control of the gain when one of the first detection signal and the second detection signal is output.

20. The method according to claim 19, further comprising:
successively controlling the gain in accordance with a variation in the reception signal until the control of the gain is completed.

21. The method according to claim 15, wherein said detecting of the beginning timing of the reception signal using the power value signal comprises:
smoothing the power value signal over a first time period, and outputting a first smoothed signal;
smoothing the power value signal over a second time period that is longer than the first time period, and outputting a second smoothed signal; and
outputting the first detection signal when a result obtained by subtracting the second smoothed signal from the first smoothed signal is greater than a first reference value.

22. The method according to claim 15, wherein said detecting of the beginning timing of the reception signal using the power value signal comprises:
smoothing the power value signal over a first time period, and outputting a first smoothed signal;
smoothing the power value signal over a second time period that is longer than the first time period, and outputting a second smoothed signal; and
outputting the first detection signal when a ratio of the first smoothed signal and the second smoothed signal is greater than a first reference value.

23. The method according to claim 15, wherein said detecting of the beginning timing of the reception signal using the correlative value signal comprises:
smoothing the correlative value signal over a third time period, and outputting a third smoothed signal; and
outputting the second detection signal when a result obtained by subtracting a preset value from the third smoothed signal is greater than a second reference value.

24. The method according to claim 15, wherein said detecting of the beginning timing of the reception signal using the correlative value signal comprises:
smoothing the correlative value signal over a third time period, and outputting a third smoothed signal; and
outputting the second detection signal when a ratio of the third smoothed signal and a preset value is greater than a second reference value.

25. The method according to claim 15, wherein said detecting of the beginning timing of the reception signal using the correlative value signal comprises:
smoothing the correlative value signal over a third time period, and outputting a third smoothed signal;
smoothing the correlative value signal over a fourth time period that is longer than the third time period, and outputting a fourth smoothed signal; and
outputting the second detection signal when a result obtained by subtracting the fourth smoothed signal from the third smoothed signal is greater than a second reference value.

26. The method according to claim 15, wherein said detecting of the beginning timing of the reception signal using the correlative value signal comprises:
smoothing the correlative value signal over a third time period, and outputting a third smoothed signal;
smoothing the correlative value signal over a fourth time period that is longer than the third time period, and outputting a fourth smoothed signal; and
outputting the second detection signal when a ratio of the third smoothed signal and the fourth smoothed signal is greater than a second reference value.

* * * * *